United States Patent
Ghanadan et al.

(10) Patent No.: US 8,284,738 B2
(45) Date of Patent: Oct. 9, 2012

(54) DISTRIBUTED ADAPTIVE SCHEDULING OF COMMUNICATIONS AMONG NODES IN A MOBILE AD HOC NETWORK

(75) Inventors: Reza Ghanadan, Berkeley Heights, NJ (US); Jessica Hsu, Washington, DC (US); Ming Luo, Jersey City, NJ (US); Shaomin Mo, Pine Brook, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 538 days.

(21) Appl. No.: 12/386,107

(22) Filed: Apr. 14, 2009

(65) Prior Publication Data

US 2010/0124205 A1   May 20, 2010

Related U.S. Application Data

(60) Provisional application No. 61/199,341, filed on Nov. 14, 2008, provisional application No. 61/199,343, filed on Nov. 14, 2008.

(51) Int. Cl.
*H04J 3/00* (2006.01)
(52) U.S. Cl. ........................................................ 370/336
(58) Field of Classification Search .................... 370/336
See application file for complete search history.

(56) References Cited

U.S. PATENT DOCUMENTS

| | | | |
|---|---|---|---|
| 6,798,761 B2 | 9/2004 | Cain et al. | |
| 6,996,061 B2 | 2/2006 | Yang et al. | |
| 7,304,972 B2 | 12/2007 | Cain et al. | |
| 7,672,232 B2 * | 3/2010 | Ayyagari et al. | 370/230 |
| 2001/0019542 A1 | 9/2001 | Diachina et al. | |
| 2005/0020299 A1 | 1/2005 | Malone et al. | |
| 2005/0063343 A1 * | 3/2005 | Hoffmann et al. | 370/334 |
| 2005/0169221 A1 * | 8/2005 | Bennett | 370/338 |
| 2005/0169307 A1 * | 8/2005 | Ayyagari et al. | 370/468 |
| 2005/0243751 A1 * | 11/2005 | Yoon et al. | 370/312 |
| 2005/0243794 A1 * | 11/2005 | Yoon et al. | 370/347 |
| 2007/0274272 A1 * | 11/2007 | Joshi et al. | 370/338 |
| 2007/0274320 A1 * | 11/2007 | Joshi et al. | 370/395.2 |
| 2008/0089311 A1 * | 4/2008 | Roy et al. | 370/345 |
| 2008/0316966 A1 * | 12/2008 | Joshi et al. | 370/330 |
| 2009/0116461 A1 * | 5/2009 | Yonge et al. | 370/337 |
| 2010/0020784 A1 * | 1/2010 | Goldfisher et al. | 370/347 |

OTHER PUBLICATIONS

K. Xu, et al., How Effective is the IEEE 802.11 RTS/CTS Handshake in Ad Hoc Networks?, University of California, Los Angeles, Computer Science Department, on-line publication (undated).

* cited by examiner

*Primary Examiner* — Kenny Lin
*Assistant Examiner* — Faisal Choudhury
(74) *Attorney, Agent, or Firm* — Leo Zucker

(57) ABSTRACT

Communications in a mobile network are scheduled by defining reservation frames having time slots during which network nodes can transmit certain traffic loads while avoiding interference. The nodes maintain maps that identify the slots as either free or reserved based on each node's existing reservations, and reservation information the node receives from neighboring nodes. A node wishing to transmit traffic determines the number of slots required to carry the traffic, selects a first set of slots from among those identified in its maps as free, and transmits a reservation initiation message (RIM) that identifies the first set of slots. Nodes receiving the RIM determine which, if any, of the first set of slots are already reserved based on their own maps, and transmit counter reservation initiation messages (CRIMs) if any slots are reserved. The CRIMs also identify those slots that the CRIM transmitting nodes determine to be currently free.

17 Claims, 5 Drawing Sheets

DISTRIBUTED ADAPTIVE SCHEDULING OF COMMUNICATIONS AMONG NODES IN A MOBILE AD HOC NETWORK

CROSS REFERENCE TO RELATED APPLICATIONS

This application claims priority under 35 U.S.C. §119(e) of U.S. Provisional Patent Application No. 61/199,341 filed Nov. 14, 2008, and entitled "Distributed Adaptive Scheduling Over Hyperarcs (DASH) Algorithm for Mobile Ad Hoc Networks", and U.S. Provisional Patent Application No. 61/199,343 also filed on Nov. 14, 2008, and entitled "Distributed Media Access Control (DMAC) For Mobile Ad Hoc Networks". Both of the mentioned '341 and '343 patent applications are incorporated herein by reference.

BACKGROUND OF THE INVENTION

1. Field of the Invention

The present invention relates to a protocol for scheduling communications among nodes in a mobile ad hoc network in such a manner as to avoid or reduce potential interference.

2. Discussion of the Known Art

U.S. Pat. No. 6,996,061 (Feb. 7, 2006) discloses a method of dynamically scheduling time division multiple access (TDMA) mobile communications. An interference level is detected, and a maximum data service rate for each block of requested sessions is calculated based on the detected interference level and certain parameters for each block. The parameters include a requested delay bound, the number of blocks being transmitted, a requested peak data rate and an acceptable minimum data rate, according to the patent.

See also, U.S. Pat. No. 6,798,761 (Sep. 28, 2004) and U.S. Pat. No. 7,304,972 (Dec. 4, 2007), both of which relate to a method and device for establishing communication links among mobile nodes in a communication system wherein each node is provided with a directional or phased array antenna, and a controller that schedules semi-permanent (SP) time slots to establish a link with each neighboring node.

Nodes in a wireless network operating under the known IEEE 802.11 protocol may utilize a RTS/CTS (request to send/clear to send) mode wherein a transmitting node desiring to send a message to a receiving node first sends a RTS frame to the receiving node. The transmitting node then waits for reception of a CTS frame from the receiving node, and only then proceeds to transmit its message.

When attempting to schedule or reserve time slots for future transmissions in a mobile ad hoc network (MANET), the reserving node is constantly challenged by and must compete with so-called hidden terminals that are beyond the immediate carrier sensing range of the node. Notwithstanding the known art, there remains a need for an operating protocol that allows nodes within a network whose topology is likely to change frequently, to schedule their transmissions in a manner that avoids potential interference caused by transmissions of other nodes which may radiate in omnidirectional patterns.

SUMMARY OF THE INVENTION

According to the invention, a method of scheduling communications among nodes in a mobile ad hoc network, includes defining reservation frames each containing a number of time slots for allowing nodes to transmit messages within certain slots reserved by the nodes while avoiding or reducing interference. Each node maintains maps of the time slots in the reservation frames for identifying the slots as either free or reserved based on reservations made by the node and information received by the node representing reservations made by other nodes in a local transmission area.

A first node desiring to transmit a given message determines a number of time slots required for containing the message when transmitted, and selects a first set of slots for containing the message from among slots identified as free in the maps maintained by the node. The first node then transmits a reservation initiation message (RIM) which includes the first set of slots, and one or more other nodes receive the RIM. Each node receiving the RIM determines which, if any, of the first set of slots is already reserved according to the maps maintained by the receiving node, and transmits a counter reservation initiation message (CRIM) if the receiving node determines one or more of the slots identified in the RIM is reserved. The CRIM includes time slots identified as free in the maps maintained by the node transmitting the CRIM.

For a better understanding of the invention, reference is made to the following description taken in conjunction with the accompanying drawing and the appended claims.

DETAILED DESCRIPTION OF THE INVENTION

Figure 1:
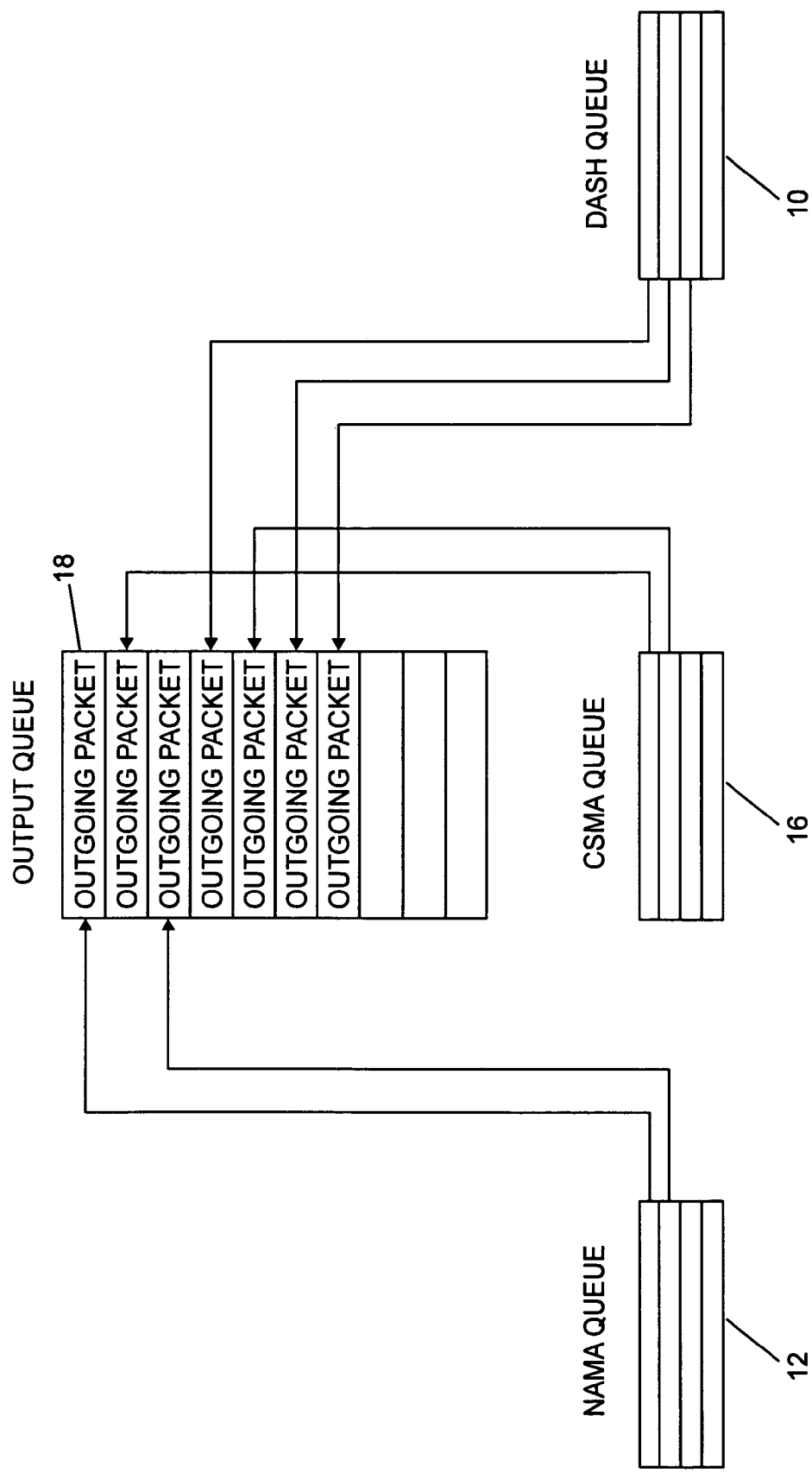
FIG. 1 is a block diagram of a queue architecture for the inventive DASH protocol.

The inventive protocol, referred to herein as Distributed Adaptive Scheduling Over Hyperarcs or "DASH", is an adaptive scheduling protocol that enables a given node in a wireless mobile network to reserve a set of time slots during which it may transmit a desired traffic load without interference from hidden terminals or other nodes not sensed initially by the reserving node. The protocol can be implemented to cooperate with complementary protocols that handle more sporadic or transient network traffic, including a so-called Dynamic Medium Access Control or "DMAC" protocol disclosed in the earlier mentioned U.S. Provisional Patent Application No. 61/199,343 filed Nov. 14, 2008, and incorporated by reference.

To allow for unevenly distributed traffic loads, DASH does not restrict or throttle the ability of a node to access available channel bandwidth. Any initial cost in overhead needed to implement the reservation process, is amortized over time due to the quasi-permanent nature of the data flows serviced by DASH. By decentralizing the reservation process, DASH enables a wireless mobile network to manage traffic without the need for a centralized control node that has the potential of becoming a single point of network failure.

Schedule Maintenance

Communications within wireless mobile networks frequently suffer from certain effects due to the changing topologies of their member nodes. The inventive protocol therefore distributes updated scheduling messages continuously among the nodes of a mobile network to ensure that conflicting transmission schedules will be avoided in a given transmission area. Relatively small sized slot schedule maps (referred to herein as Bit Illustrated Maps or BIMS) are communicated among the nodes during unscheduled time slots. Each map represents a snapshot of a defined reservation frame as seen by the node that transmits the BIM, and is preferably in the form of, e.g., a string of bits wherein 1's represent slots that are reserved, and 0's represent slots that are free, i.e., slots available for transmissions that receiving nodes may want to send in the future. Assuming, for example, that a given network frame contains several hundred time slots that may be reserved, each BIM need only be several hundred bits long thus making the cost of distributing BIMs fairly insignificant.

To facilitate protection from the mentioned hidden terminal scenario, different kinds of BIM tables are maintained and updated at each node. For example, each node maintains a BIM table that contains only "personal" reservations made by the node itself, and reservations that were overheard or personally witnessed by the node. A Local BIM (LBIM) table identifies the owner of the reservation in a particular slot. An Extended BIM (EBIM) table containing BIM updates from neighboring nodes, is also maintained. When a node transmits a BIM update, it sends only its own LBIM, and keeps its EBIM table as a local variable that may be updated internally with each BIM refresh.

In addition to the mentioned BIM tables, each node keeps track of the last time a reserved slot entered in its LBIM table was actually used. This may be done, for example, simply by using an internal Last Usage (LU) table for upkeep and deallocation of current reservations.

Reservations

When a node desires to reserve a certain number of time slots to transmit a given traffic load, the node transmits the request (referred to herein as a Reservation Initiation Message or RIM) during currently unused time slots to reserve its desired slots for a certain duration of time. The duration is preferably configurable, and may be set to whatever is convenient. Active reservations and reservations in progress are kept in separate tables for management and reference. To avoid interfering with neighboring nodes who may also be attempting to request reservations, a requesting node may use, e.g., a simple CSMA algorithm with a known distributed coordination function (DCF) for collision avoidance, and thus minimize network overhead.

The contents of the RIM message preferably include:

1. Reservation BIM (RBIM) which identifies the newly requested time slots. The requested slots may be selected randomly from among those marked as free in the requesting node's LBIM and EBIM.

2. Proposed Start Time (PST) which is set to a time far enough ahead to allow neighboring nodes sufficient time to update their LBIM tables, or to send back a Counter Reservation Initiation Message (CRIM) (see below) if a scheduling conflict exists.

3. Proposed End Time (PET) which is set to a time beyond the PST and which concludes the duration of the requested reservation.

4. RIM ID. This is a unique message ID that may comprise, e.g., 32 bits.

When a node receives a RIM message, it examines the included RBIM (the newly requested time slots) and decides if a conflict exists with any other active reservations or RIMs in progress. If there are no conflicts, the receiving node puts the RIM's proposed reservation slots in a temporary buffer while it awaits the PST included in the RIM. If there is a conflict, however, the receiving node generates a CRIM to respond to the node that transmitted the RIM. The CRIM contains the RIM ID of the offending RIM, and a revised RBIM identifying only the conflicting slots. When the node that transmitted the initial RIM receives the CRIM, it generates another RIM with the same RIM ID so as effectively to amend the RIM currently in progress. The PST and the PET need not change throughout the negotiation process.

The foregoing conflict negotiation repeats until the node that transmitted the initial RIM ceases to receive CRIMs, or the PST arrives. When a RIM's PST arrives, both the node that transmitted the initial RIM and all nodes that received it assume the RIM in question has completed as proposed. All nodes then update their BIM and LBIM tables to reflect these changes.

Slot Maintenance

When an active reservation's PET arrives, the corresponding time slots are marked as free in the BIM and LBIM tables, and the slots will be available for future reservations.

Preferably, nodes within the network periodically send out updates of their BIM, so that other nodes can determine if any conflicts exist within their local transmission area.

As summarized above, the inventive DASH protocol maintains a number of resources locally at each node. These resources and their operation are defined further below.

DASH Data Structures

Schedule Maps

BIM (Bit Illustrated Map): A map of a defined frame (or sub-frame) of time slots, wherein slots reserved for future transmissions and unreserved slots are each identified as such. A BIM is a local variable unique to each network node, and may be in the form of a string of bits each of which corresponds to a different slot in the frame. For example, the position of each bit in the string may correspond to the position of the slot that the bit represents in the frame, wherein a "1" bit represents an existing reservation for the corresponding slot, and a "0" bit represents no known reservation for the slot. Each node's BIM is saved as a local variable. Note that the BIM contains only reservations that the node itself has actively made, or heard being made by other nodes.

LBIM (Local Bit Illustrated Map): A map frame that identifies a particular node that made a reservation for a given slot. A LBIM differs from a BIM in that it comprises an array of characters whose indices correspond to slot positions in a frame, together with the ID of the node that reserved the slot(s). Thus, the LBIM may be used in conjunction with the BIM to determine who is expected to transmit within a reserved frame. Note that the LBIM contains the local node's own reservations in addition to any RIM negotiations (see below) it overheard or took an active part in making.

EBIM (Extended Bit Illustrated Map): A BIM that covers up to two hops by gathering up overheard BIM updates. An EBIM is a bitwise combination of BIM updates from one hop neighbors of the local node. This data is preferably kept updated for changes in reservations. Note that if BIM updates are transmitted during time slots obtained via a known complementary Node Activated Multiple Access (NAMA) protocol, then two EBIMs are maintained; namely, an EBIM that contains updates from the BIM updates during a current frame, and an EBIM that contains the BIM updates from the previous frame. The inventive DASH reservation process preferably uses the EBIM that contains BIM updates from the previous frame. The EBIM that is updated from BIM updates during the current frame iteration simply creates a completed EBIM for use in the next frame iteration. The NAMA protocol is disclosed in a published article by L. Bao, et al., titled "Distributed dynamic channel access scheduling for ad hoc networks", Journal of Parallel and Distributed Computing, vol. 63, issue 1 (January 2003) at pages 12-13. All relevant portions of the mentioned Bao, et al. article are incorporated by reference.

Note also that the BIM is the only kind of map a node actually needs to send to other nodes, and the map may be transmitted during a determined time slot as a BIM update. Assuming slot sizes are spaced for 500 byte packets, the size of the BIM would be as in Table 1:

TABLE 1

BIM size

| Frame Size (in time slots) | BIM Size (in bytes) |
|---|---|
| 2750 | 344 |
| 2000 | 250 |
| 1500 | 188 |
| 1000 | 125 |
| 500 | 63 |

Reservation Table

A reservation table is a two dimensional array that contains information concerning reservations that have already been made. The table may contain detailed information about the reserved slots within the BIM, and it preferably includes the following information:

1. Start time: A clock tick representing the point in time at which the reservation was first initiated.
2. Expiration time: The clock tick when the reservation will expire and have to be removed.
3. Slots Reserved: A bit illustrated map that shows which slots are reserved.

RIM Table

A Reservation Initiation Message (RIM) table that keeps track of reservations that are in process. The table is saved at each node as a two dimensional array and preferably includes the following information:

1. Reservation BIM: A BIM that specifies which slots are being reserved.
2. Proposed Start Time: A certain time in the future when the RIM will activate into an actual reservation.
3. Proposed End Time: A time in the future when the RIM will expire.
4. RIM ID: A unique, e.g., 32 bit ID that corresponds to the RIM.
5. Reserver ID: The ID of the reserving node.

Queues

In one preferred embodiment, the inventive DASH protocol accesses and links itself to three transmission queues (see FIG. 1) that are implemented at each node under, for example, the complementary DMAC protocol disclosed in U.S. Provisional Patent Application No. 61/199,343 and incorporated by reference. The queues are described below.

DASH queue 10: A DMAC transmission buffer that DASH must service. While the DASH queue 10 is not directly manipulated under the inventive protocol, the DASH queue is preferably checked to determine whether or not a number of reservations made under DASH should be increased.

NAMA Queue 12: A DMAC defined queue that is also not directly manipulated by DASH. The BIM generated by DASH is set at the beginning of every NAMA queue 12. As implied, this never causes a new NAMA Queue entry to be created.

CSMA Queue 16: A CSMA Queue is used for transmission of Dash Control Messages (DCMs). Note that when the present specification refers to the addition of an item to the "CSMA queue", the subject message is actually added to a DMAC defined Output Queue 18 in FIG. 1, and a link to the message is the item that is added to the CSMA queue 16.

Figure 2:
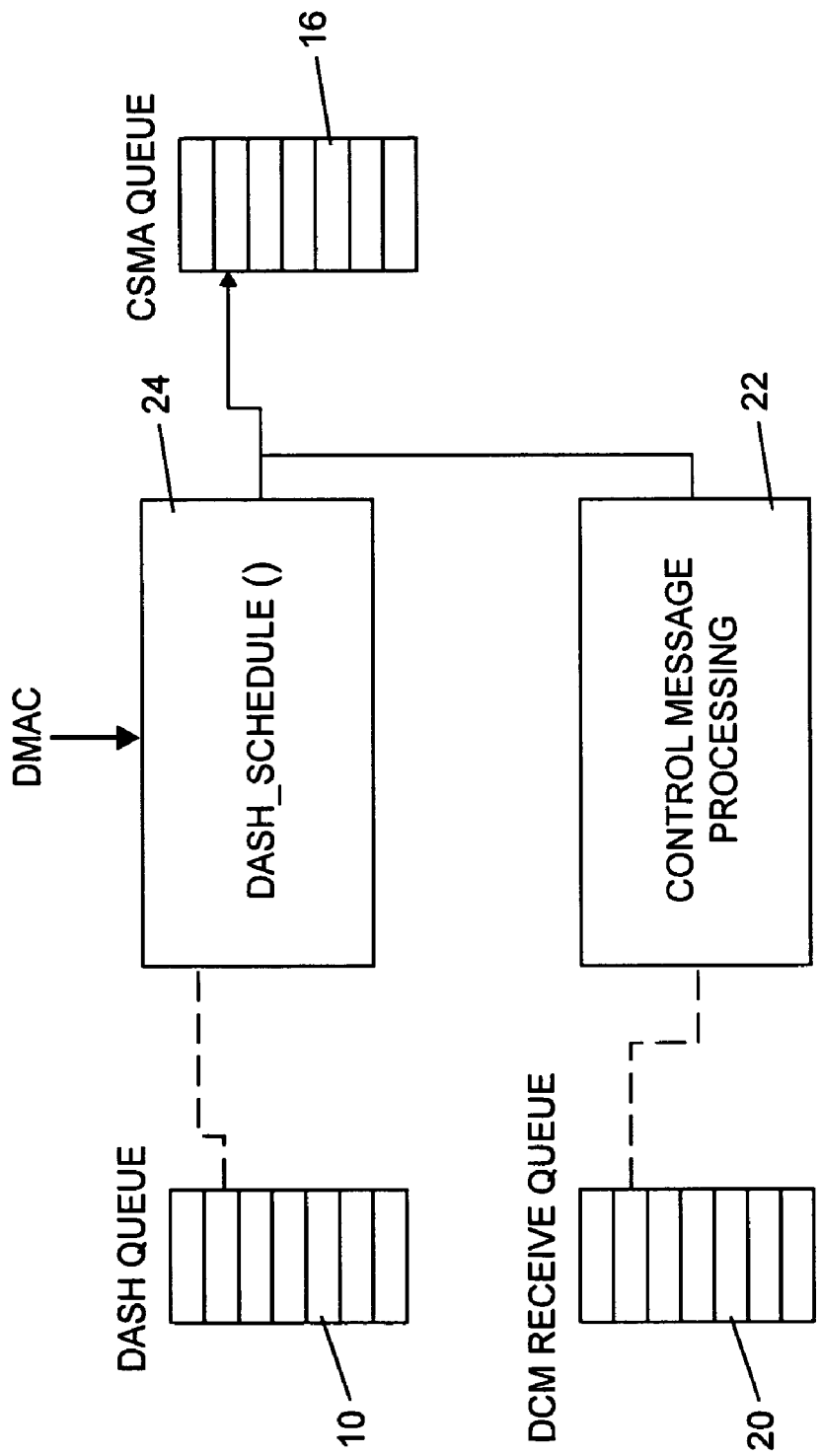
FIG. 2 is a block diagram illustrating a processing architecture for the DASH protocol.

In addition, as shown in FIG. 2, the inventive DASH protocol defines its own Dash Control Message (DCM) Receive Queue 20 which is, e.g., a FIFO queue that stores received DCM messages until the messages are examined by a Control Message Processing Module 22. The DCM messages include the RIM, the CRIM, and the BIM messages described above.

DASH Functionality

As shown in FIG. 2, the functionality of the DASH protocol may be described in terms of two main processing modules, namely;

1. Control Message Processing 22: This process runs independently of the transmission of DCMs and the interface with the complementary, e.g., DMAC, protocol. The processing includes receiving incoming DCMs in the Receive Queue 20 at each node, and, if necessary, placing responsive messages into the CSMA Queue 16 for transmission.

2. DASH_Schedule( ) 24: This process interacts with the complementary (DMAC) protocol and the DASH Queue 10 to determine a number of reservations to be made (e.g., per DASH reservation methodology, described further below) to satisfy current demands. The process also maintains the Reservation Table at each node.

FIG. 2 also shows how the processes combine to form a software structure for the DASH protocol. In FIG. 2, the only invocation to the DASH process structure is a call by the complementary (DMAC) protocol to DASH_Schedule( ) 24.

DASH Reservation Methodology

Figure 3:
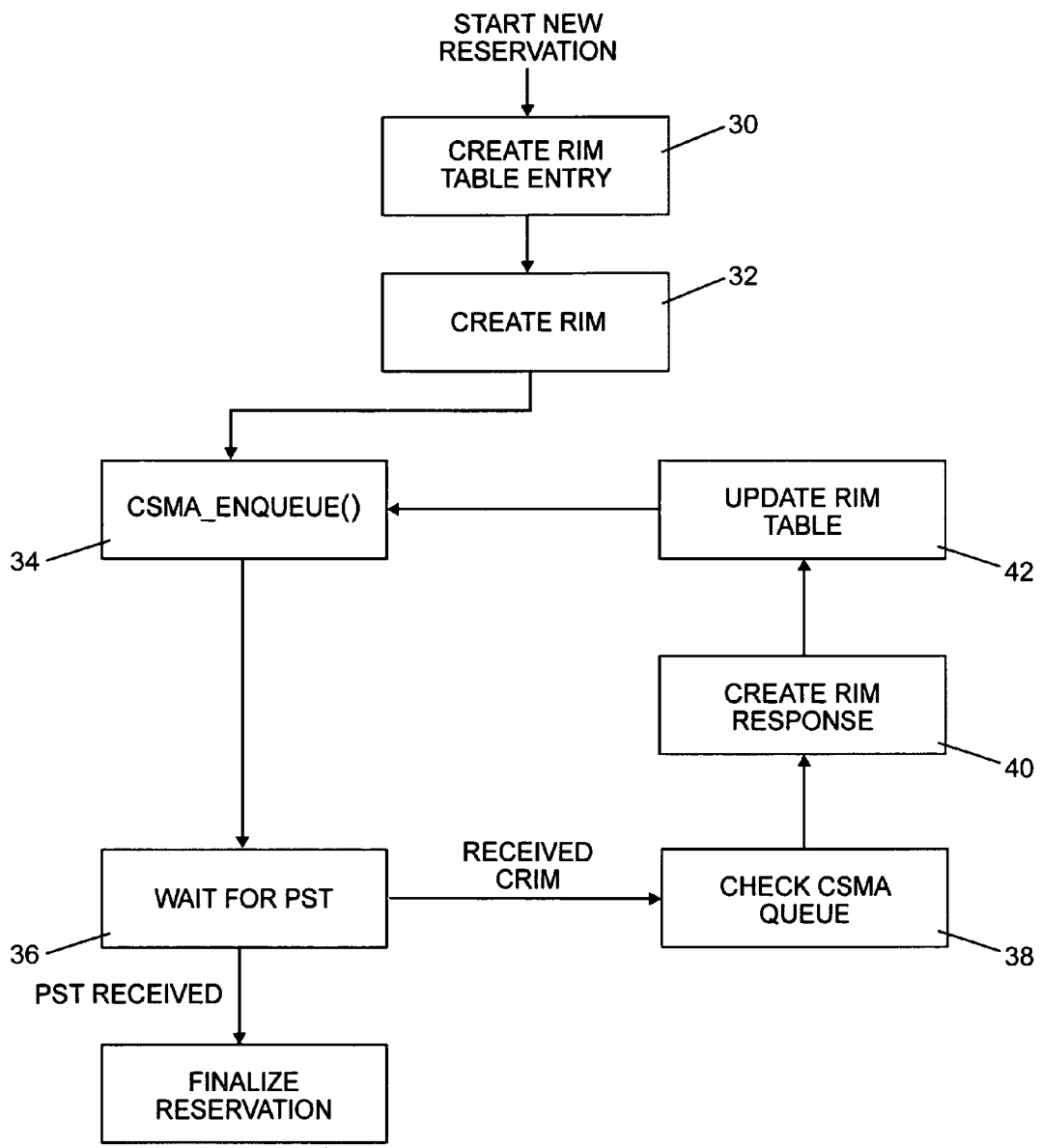
FIG. 3 is a block diagram showing steps of the protocol by which a node initiates a slot reservation process and transmits a reservation initiation message (RIM)

FIG. 3 is a block diagram that illustrates the DASH reservation process wherein a reserving node, referred to below as a RIM transmitter, initiates a new reservation for a sufficient number of time slots to send a desired traffic load or message. As noted earlier, DASH uses two types of messages to make reservations, namely;

1. A Reservation Initiation Message (RIM) containing:
a. Reservation BIM (RBIM)—the newly requested slots which the RIM transmitter may have selected randomly from known available free slots (i.e., those slots marked as free in the BIM and the EBIM tables at the transmitter).
b. Proposed Start Time (PST)—set, for example, to one second in the future from the moment the RIM message is transmitted.
c. Proposed End Time (PET)—set, e.g., to ten seconds after the PST.
d. RIM ID—a unique (e.g., 32 bit) ID for the current RIM session.

Note that a RIM message is always sent by a RIM Transmitter, i.e., the node that is initiating a reservation for itself. Also note that the time intervals stated in b. and c. above may vary depending on network parameters such as transmission speed, slot size, frame size, and the like.

2. A Counter Reservation Initiation Message (CRIM) containing:

a. Free BIM (FBIM)—a bit illustrated map that contains a map of slots known by the CRIM sending node as being available.

b. PST—this is updated to a time appropriate to account for the delay of the RIM.

c. PET—this is likewise updated to a time appropriate to account for the delay of the RIM.

d. RIM ID—the ID of the RIM message to which the current CRIM message is responding.

Figure 4:
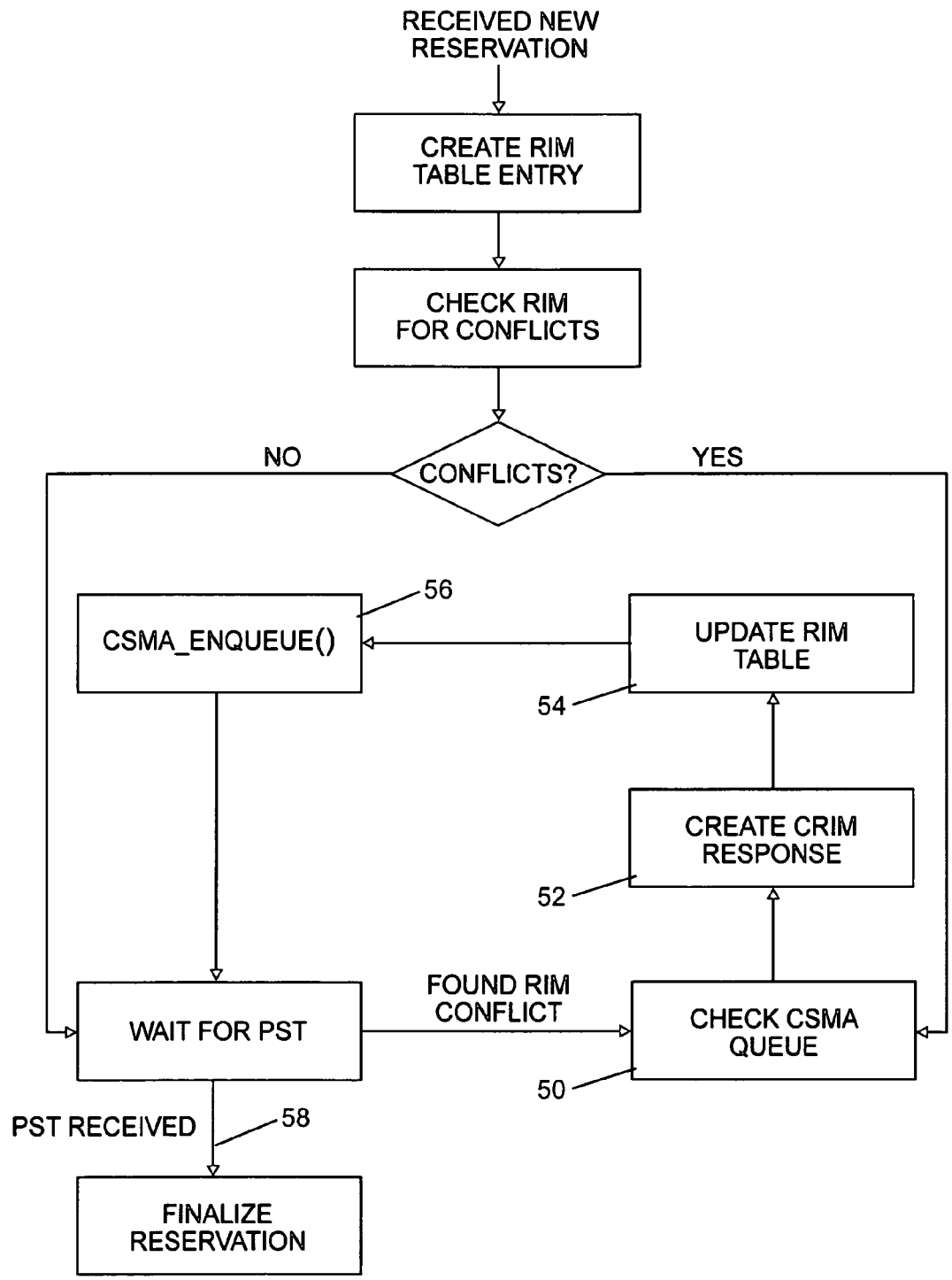
FIG. 4 is a block diagram showing steps followed by a node that receives the RIM and, if necessary, transmits a counter reservation initiation message (CRIM) in response to the RIM according to the protocol.

Note that CRIM messages are sent exclusively by RIM receiver nodes (see FIG. 4). When a CRIM is used, the PST and PET times should be updated to give the reservation process enough time to exchange any additional messages to negotiate the current scheduling conflict. Any change in the PST and the PET times should be recorded in the RIM Table as well.

Since this is a best attempt reservation negotiation, it is not necessary to account for timeouts for RIM messages. If the RIM messages are not countered with a CRIM, they will simply become committed to the BIM tables of any affected nodes when the PST for the messages arrives.

As described above, a typical reservation process under DASH will proceed as follows:

1. A RIM Transmitter node transmits a RIM message to initiate a reservation for a certain number of time slots.

2. All nodes in range (one hop RIM Receivers) are allowed the option of sending a CRIM in reply if a scheduling conflict is determined to exist at any of the receiving nodes.

3. If a CRIM is received by the RIM Transmitter, the included Free BIM information is used to generate a new RIM, and step 1. above is repeated by the RIM transmitter until no CRIM is received.

Thus, a RIM Transmitter initiates a reservation by sending an initial RIM message, and any successive RIM messages necessary to complete the reservation process. FIG. 3 illustrates a number of steps the Transmitter may take when preparing its RIM transmissions and when receiving CRIM messages.

In FIG. 3, the RIM Transmitter makes an initial RIM transmission by creating a RIM Table entry 30 for a new reservation, and sending out a corresponding RIM 32 by queuing the message into, for example, an output or CSMA Enqueue 34. At 36, the node awaits the arrival of the PST that was set in the initial RIM transmission. The PST is stored in the node's own RIM Table, and is updated and refreshed each time a CRIM including the same RIM ID is received.

Upon reception of a CRIM message, the RIM Transmitter performs the following steps:

a. Check CSMA Queue 38—the RIM transmitter checks if there is a RIM message already in flight with the same RIM ID. If so, it pulls the message from the CSMA enqueue 34 and saves the RBIM contained within. If not, it continues to Create RIM Response 40.

b. Create RIM Response 40—the RIM transmitter uses the RBIM saved from Check CSMA Queue 38 and the FBIM in the newly received CRIM, to create a new RIM.

c. Update RIM Table 42—the RIM transmitter updates the table entry for the newly created RIM.

d. CSMA_Enqueue( ) 34—the RIM transmitter enters the newly created RIM into the Output queue 18 in FIG. 1 and adds a corresponding link to this entry to its CSMA Queue 16 (FIG. 2).

Once the PST is reached without interruption (at 34), the new reservation is committed to the Reservation Table, and the corresponding RIM Table entry is deleted.

RIM Receivers are defined as network nodes that are within receiving (one hop) range of a RIM Transmitter. As illustrated in FIG. 4, a RIM Receiver is configured to transmit a CRIM message if it determines that a potential conflict in slot usage exists, thus avoiding the mentioned hidden terminal situation. The RIM receiver's actions may be implemented in the Control Message Processing module 22 in FIG. 2.

Specifically, upon its initial reception of a RIM message, a RIM receiver determines if the BIM contained in the message presents any conflict with slots already marked as reserved in the receiver's own BIM. If not, the receiver waits for the PST to arrive. If a conflict is determined, however, the receiver initiates a CRIM message in response, as follows:

a. Check CSMA Queue 50—the receiver checks if a CRIM message having the same RIM ID is already in flight. If so, the receiver pulls this CRIM message from the CSMA Queue 16. If not, the receiver continues to Create RIM Response 52.

b. Create RIM Response 52—referring to its own BIM, the receiver creates a new CRIM.

c. Update RIM Table 54—the receiver updates the table entry for the newly created CRIM.

d. CSMA_Enqueue( ) 56—the receiver enters the newly created CRIM into the Output queue, 18 in FIG. 1, and then adds a link to this entry to the CSMA Queue 16.

When the PST is reached without interruption (at 58), the receiver commits the new reservation to its Reservation Table, and the corresponding RIM Table entry is deleted.

Periodic updates are preferably sent by each network node to notify surrounding nodes of the contents of the sending node's BIM. When hearing these updates, the surrounding nodes can then generate or refresh their own EBIM tables.

DASH Schedule

Figure 5:
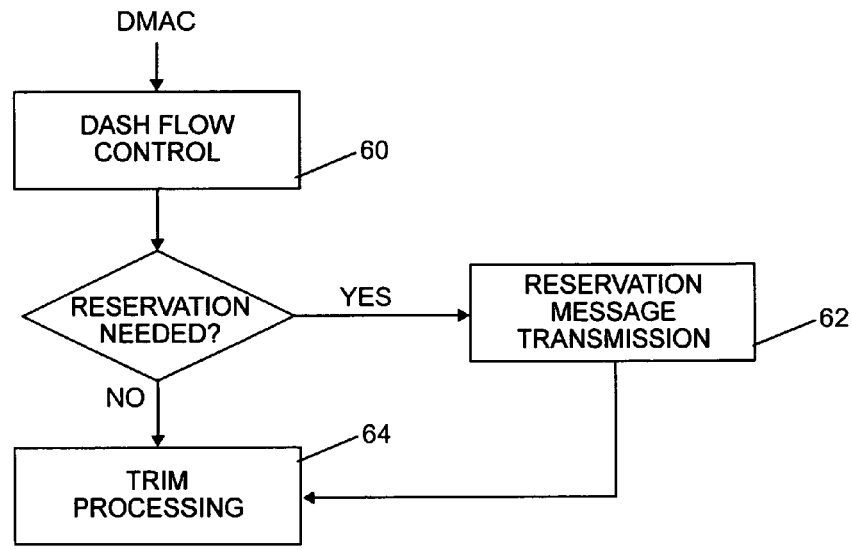
FIG. 5 is a block diagram of an interface between the inventive protocol and a complementary network operating protocol.

As shown in FIG. 2, DASH_Schedule( ) 24 is a process that may be called by DMAC or other complementary protocol operating in the network. When called, DASH_Schedule( ) 24 evaluates whether or not new reservations are necessary. FIG. 5 shows an example of such an interface between the inventive DASH and DMAC protocols.

In FIG. 5, DASH Flow Control 60 determines if a current number of reservations is sufficient to handle a currently pending transmission load waiting in the DASH queue 10 in FIGS. 1 and 2. The determination may be based on the number of messages in the DASH queue 10, and whether or not it is possible for the messages to be transmitted over the duration of a frame given the number of reservations currently made. The number of current reservations also includes reservations in progress (located in the RIM Table). If this is not possible, the number of slots required is sent to the Reservation Message Transmission process 62, which operates to obtain the needed slots. If DASH Flow Control 60 determines there is an excess of reservations for the current traffic load, it refrains from sending additional RIM messages since the current reservations will eventually expire and thus leave their associated slots open for future reservations.

DASH Flow Control 60 may attempt further reservations as long as it judges that additional bandwidth is required, and there are sufficient slots that remain unreserved. A cut-off at which further reservations are not allowed may be defined, for example, at a 90% reservation load. A certain number, for example, ten percent of total DASH-accessible slots should remain unreserved so that DCMs and other important messages can always be transmitted. The cut-off value may also vary depending on various network conditions and circumstances.

When DASH Flow Control 60 decides to make a reservation, it calls the Reservation Message Transmission process 62 which in turn maintains a link to the RIM that it just placed into the CSMA Queue 16 in FIGS. 1 and 2. If a new reservation is needed before the existing RIM is actually transmitted, the Reservation Message Transmission process 62 amends the new slots needed in the existing message. This prevents any unnecessary messages from being transmitted.

A TRIM Processing module 64 is configured to check the Reservation Table to determine if any changes should be made to the BIM due to reservation expirations. If there are any expired reservations, the module 64 updates the BIM as necessary and deletes the relevant entry from the Reservation Table.

Reservation Message Transmission

To make a reservation, the Reservation Message Transmission process 62 generates a Reservation Initiation Message (RIM), the contents of which include the above described Reservation BIM (RBIM), Proposed Start Time (PST), Proposed End Time (PET) and RIM ID.

After the RIM is prepared, it is placed in the CSMA queue 16 for transmission, and a corresponding RIM Table entry is created. Note that the Reservation Message Transmission process 62 is only responsible for generating the initial RIM for a given reservation, and for creating a corresponding RIM Table entry. The Control Message Processing module 22 in FIG. 2 operates to complete the reservation process once it has been started, and to maintain the RIM Table entries during the reservation process.

Control Message Processing

The Control Message Processing module 22 in FIG. 2 is configured to process DCMs and, as mentioned, to complete reservations. All received DCMs are placed into the DCM Receive Queue 20 in FIG. 2.

Figure 6:
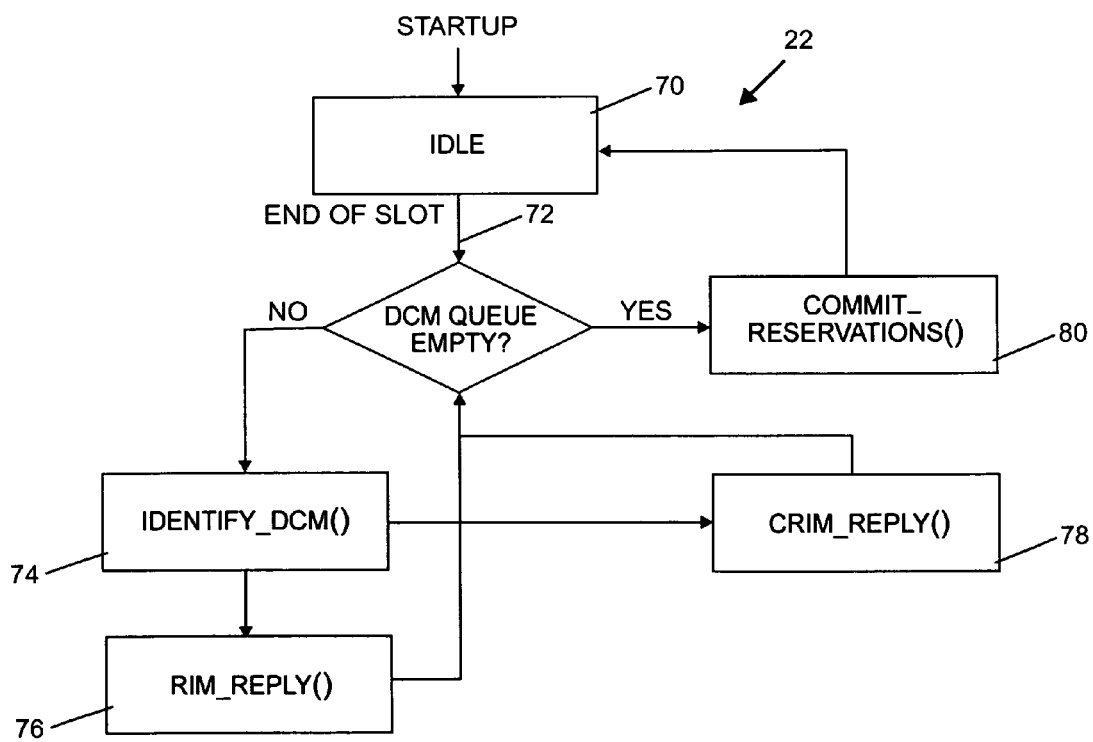
FIG. 6 is a block diagram of a control message processing module in FIG. 2.

As seen in FIG. 6, Control Message Processing is normally at idle 70. When at idle, the process puts itself to sleep until an End of Slot 72 is determined, at which time the process wakes up and processes all received DCMs (if any) and finalizes any existing reservations. The functions represented in FIG. 6 are explained below:

Identify_DCM( ) 74: Dequeues from the DCM Receive Queue 20 (FIG. 2) and, depending on whether the resulting DCM is a RIM or a CRIM message, calls either RIM_Reply( ) 76 or CRIM_Reply( ) 78.

RIM_Reply( ) 76: The receiving node examines the received RIM message and creates a RIM Table entry if necessary with the specified RIM Table fields. If, after examining its own BIM and EBIM tables, a node determines it has a conflict with the RIM, it sends a CRIM message in reply by placing the message into the CSMA Queue 16. The node inserts a copy of its own BIM into the Free BIM (FBIM) portion of the CRIM message, so that the RIM transmitter can narrow its choice of slots appropriately. Note that it is possible to receive a RIM whose ID matches that of a RIM to which the receiving node has already created a responsive CRIM message, but had no opportunity to transmit. If a RIM message is received and a corresponding CRIM message still resides in the CSMA Queue, the CRIM message is preferably deleted and the newly received RIM dealt with from scratch.

CRIM_Reply( ) 78: The receiving node examines the received CRIM message, and uses the FRIM portion of the message to regenerate a RIM for transmission via the CSMA Queue 16 in FIGS. 1 and 2. Note that the node must check the CSMA Queue 16 for outgoing RIM messages that are relevant to the CRIM it has received, since it is possible to receive multiple CRIM responses to a given RIM. When this occurs, the outgoing RIM must be removed from the CSMA Queue 16 and updates must be made to it after taking into account the information contained in the FRIM portion of the newly received CRIM message.

Commit_Reservations( ) 80: Checks the RIM Table for reservations whose PSTs have arrived. All reservations whose PSTs have arrived are written into the BIM and an appropriate entry is added to the Reservation Table.

As described herein, the inventive DASH protocol offers significant advantages over existing ad hoc reservation mechanisms such as, e.g., IEEE 802.11 with RTS/CTS. The protocol allows a given node to negotiate for and reserve network resources, and protects scheduled transmissions from collisions with transmissions from nodes outside the sensing range of the given node. The reservations may be made on a long term basis so that any overhead incurred by the reservation process is amortized over time. Unused bandwidth is distributed adaptively and safely to nodes requiring it more than others, and bandwidth is recovered each time a node releases a previous reservation it no longer needs or when a node moves outside transmission range. The nodes can operate effectively using simple omnidirectional antennas, while still allowing for an appreciable degree of spatial reuse within the network.

Although the inventive DASH protocol may not be optimal timewise for relatively short transmissions, it can cooperate with a complementary protocol such as DMAC that can handle such transmissions more efficiently. And, because the DASH reservation decision process is distributed among a number of nodes, there is no potential single point of failure.

While the foregoing represents preferred embodiments of the invention, it will be understood by those skilled in the art that various modifications and changes may be made without departing from the spirit and scope of the invention. For example, instead of or in addition to time slots, the inventive protocol may be used to manage other network resources including, e.g., frequencies, codes, and/or channels. Accordingly, the invention includes all such modifications and changes as are within the bounds of the following claims.

We claim:

1. A method of scheduling communications among nodes in a mobile ad hoc network, comprising:

defining successive reservation frames in the network each containing a number of time slots for allowing nodes of the network to transmit traffic including messages to one another within certain slots reserved by the nodes while avoiding or reducing potential interference;

maintaining, at a given node, one or more maps of time slots contained in the reservation frames and identifying the slots as being either free or reserved based on (a) slot reservations made by the given node, and (b) information received by the given node representing slot reservations made by other nodes of the network;

determining, at the given node, a number of time slots required for containing a certain traffic load desired to be transmitted by the given node;

selecting, at the given node, a first set of the required number of time slots for containing the traffic load from among those slots identified as free in the maps maintained by the given node;

confirming that time slots selected at the given node for containing the desired traffic load are free, by transmitting a reservation initiation message (RIM) from the given node, including identifying the first set of time slots in the RIM;

receiving the RIM at one or more of the other nodes of the network;

determining, at each node receiving the RIM, which, if any, of the first set of time slots identified in the RIM is reserved according to the maps maintained by the RIM receiving node;

transmitting a counter reservation initiation message (CRIM) from one or more nodes receiving the RIM only if a RIM receiving node determines that one or more of the time slots identified in the RIM are reserved, and including, in the CRIM transmitted by each RIM receiving node, a Free Bit Illustrated Map (FBIM) containing a map of the slots known by the RIM receiving node as being available;

receiving at the given node one or more CRIMs if transmitted from the RIM receiving nodes, selecting a revised set of time slots for containing the traffic load from among slots identified as being free in the FBIMs included in the received CRIMs, and transmitting a corresponding new RIM from the given node;

repeating at the given node the steps of transmitting a RIM, receiving the CRIMs, and selecting a revised set of time slots for containing the traffic load from among slots identified as free in the FBIMs included in the received CRIMs, and transmitting a corresponding new RIM from the given node until no CRIMs are received are after a determined time, thereby confirming that either the first or a last revised set of time slots selected at the given node are free;

transmitting the desired traffic load from the given node in the set of time slots that are confirmed as being free;

determining, at the given node, if a current number of slot reservations is sufficient for handling a pending traffic load awaiting transmission in a scheduling queue at the node; and if it is determined that an excess number of slot reservations are available for the pending traffic load, refraining from transmitting additional RIM messages from the given node until the current reservations expire thus leaving slots associated with the current reservations open for future slot reservations.

2. A method of scheduling communications among nodes according to claim 1, including identifying a proposed start time (PST) in the RIM.

3. A method of scheduling communications among nodes according to claim 2, including identifying a proposed end time (PET) in the RIM.

4. A method of scheduling communications among nodes according to claim 1, including providing a RIM identification (RIM ID) in the RIM.

5. A method of scheduling communications among nodes according to claim 1, including identifying an updated start time in the CRIM.

6. A method of scheduling communications among nodes according to claim 5, including identifying an updated end time in the CRIM.

7. A method of scheduling communications among nodes according to claim 4, including providing the RIM ID in the CRIM.

8. A method of scheduling communications among nodes according to claim 1, including radiating the RIM from the first node in a generally omni-directional pattern.

9. A method of scheduling communications among nodes according to claim 1, including radiating the CRIM from nodes receiving the RIM in generally omni-directional patterns.

10. A method of scheduling communications among nodes according to claim 2, including transmitting the traffic load from the given node at the later of the PST identified in the RIM, or an updated start time identified in a latest CRIM received by the given node.

11. The method of claim 1, including defining, at the given node, a bit illustrated map (BIM) in the form of a string of bits each corresponding to a different time slot in a reservation frame.

12. The method of claim 11, including arranging the string of bits so that the position of each bit corresponds to the position of the time slot represented by the bit in the reservation frame.

13. The method of claim 11, including periodically transmitting, from the given node, a bit stream corresponding to the BIM maintained at the given node.

14. The method of claim 1, including determining if a number of pending messages in the scheduling queue can be transmitted over the duration of a reservation frame.

15. The method of claim 1, including, if it is determined that the current number of slot reservations is not sufficient, transmitting a RIM message from the given node identifying a required number of additional slots to be reserved.

16. The method of claim 1, wherein the time slots for containing the traffic load desired to be transmitted from the given node are selected randomly from among slots identified as free according to maps at the given node.

17. The method of claim 1, including maintaining a Last Usage (LU) table at the given node for tracking the last time a reserved slot entered in maps at the node was actually used.

* * * * *